United States Patent [19]

Nitta

[11] Patent Number: 5,133,012
[45] Date of Patent: Jul. 21, 1992

[54] SPEECH RECOGNITION SYSTEM UTILIZING BOTH A LONG-TERM STRATEGIC AND A SHORT-TERM STRATEGIC SCORING OPERATION IN A TRANSITION NETWORK THEREOF

[75] Inventor: Tsuneo Nitta, Yokohama, Japan
[73] Assignee: Kabushiki Kaisha Toshiba, Kawasaki, Japan
[21] Appl. No.: 443,485
[22] Filed: Nov. 30, 1989

[30] Foreign Application Priority Data

Dec. 2, 1988 [JP] Japan .................. 63-305789

[51] Int. Cl.$^5$ .............................. G10L 7/08
[52] U.S. Cl. ...................................... 381/43
[58] Field of Search ................ 381/41–45; 364/513.5

[56] References Cited

U.S. PATENT DOCUMENTS

| | | | |
|---|---|---|---|
| 4,624,011 | 11/1986 | Watanabe et al. | 381/43 |
| 4,625,287 | 11/1986 | Matsuura et al. | 364/513.5 |
| 4,677,672 | 6/1987 | Ukita et al. | 381/43 |
| 4,677,673 | 6/1987 | Ukita et al. | 381/43 |
| 4,803,729 | 2/1989 | Baker | 381/43 |
| 4,868,879 | 9/1989 | Morito et al. | 381/43 |
| 4,888,823 | 12/1989 | Nitta et al. | 364/513.5 |
| 5,001,760 | 3/1991 | Nitta | 381/43 |
| 5,018,201 | 5/1991 | Sugawara | 381/41 |

OTHER PUBLICATIONS

ICASSP'87 International Conference on Acoustics, Speech, and Signal Processing, Dallas, Apr. 4–9, 1987, vol. 1, pp. 364–367, IEEE, New York, US; B. Merialdo: "Speech recognition with very large size dictionary".
ICASSP'88, International Conference on Acoustics, Speech, and Signal Processing, New York, Apr. 11–14, 1988, vol. 1, pp. 119–122, IEEE, New York, US; L. R. Rabiner et al; "High performance connected digit recognition using hidden Markov models".
IEEE Transactions on Acoustics, Speech, and Signal Processing, vol. 1 ASSP-33, No. 6, Dec., 1985, pp. 1404–1413, IEEE, New York, US; B. H. Juang et al; "Mixture autoregressive hidden Markov models for speech signals".

Primary Examiner—Dale M. Shaw
Assistant Examiner—Michelle Doerrler
Attorney, Agent, or Firm—Oblon, Spivak, McClelland, Maier & Neustadt

[57] ABSTRACT

A plurality of candidate phonetic segments extracted from the input speech signal are passed through transition networks prepared for the respective words so as to obtain a score by weighting/averaging the long-term strategic scores by taking consideration of statistic distribution of the similarities or distances of phonetic segments and the short-term strategic scores by taking consideration of the environment of the phonetic segments.

5 Claims, 5 Drawing Sheets

| FRAME NO. | POWER SPECTRUM (LEVEL) 1 2 3 4 5 6 7 (SYMBOL) − − + 7 Z M | ACOUSTIC FEATURE | PHONETIC SEGMENT LATTICE 1ST 2ND 3RD 4TH 5TH | POWER |
|---|---|---|---|---|
| 1 | . . . . . . . | | II2A NI1C OZ1A EE1A XN1A | * |
| 2 | . . . . . . . | | ES1A NI1C R12B SS1B I12A | * |
| 3 | . . . . . . . | | II3A IQ1A II2A SS1B ES1A | * |
| 4 | . . . . . . . | | XL1A IX1A AN1A EE2A UU1A | * |
| 5 | . . . . . . . | | OO2A XL1A AN2A QI1C QO1C | * |
| 6 | . . . . . . − | Q | TE1C QI1C ES1A QO1C II2A | * |
| 7 | . . . . . . − | Q | R12B II2A TE1C EE2A ON1A | * |
| 8 | . . − − − − − | Q | II3A NN2A II2A NN1A II1A | * |
| 9 | . − + − − − − | Q | II3A NN2A II1A II2A NI1C | * * |
| 10 | − + + + − − − | Q | NI1C NN2A II3A II1A R12B | * * * |
| 11 | + + + + + + + | Q | NI1C II1A II3A NN2A IE1C | * |
| 12 | + + + + + + + | | II1A II3A IE1C NN2A II2A | * * |
| 13 | + + + + + + − | | II1A IE1C II3A NN2A EE2A | * * |
| 14 | + + + + + − − | | II1A II2A II3A II2A NN2A | * * * |
| 15 | + + + + + − − | | II1A IE1C IE1C II3A QI1C | * |
| 16 | + 7 7 + + − − | | II1A II2A IE1C QI1C R12B | * * * |
| 17 | + 7 7 + + + − | | II1A II2A II3A IE1C R12B | * * |
| 18 | + 7 7 + + + + | | II1A IE1C IE1C II3A EE2A | * * * * |
| 19 | + 7 Z − + − − | | II1A IE1C II2A II3A EE2A | * * |
| 20 | + 7 Z 7 + + + | | II1A IE1C IE1C II3A EE2A | * * |

SPEECH RECOGNITION SYSTEM UTILIZING BOTH A LONG-TERM STRATEGIC AND A SHORT-TERM STRATEGIC SCORING OPERATION IN A TRANSITION NETWORK THEREOF

BACKGROUND OF THE INVENTION

1. Field of the Invention

This invention relates to a speech recognition system which effects a scoring operation to select a word candidate or candidates by use of transition networks.

2. Description of the Related Art

Recently, various studies have been made on speech recognition systems and the speech recognition performance has been remarkably enhanced. In one of the speech recognition systems, input speech is acoustically analyzed to derive feature parameters thereof, the feature parameters are compared with or verified with reference to a dictionary prepared for each phonetic segment, such as a phoneme, to detect a segment lattice including a plurality of phoneme candidates and the similarity of the thus detected segment lattice, and then a word is recognized based on the detected segment lattice. As disclosed in U.S. Pat. No. 4,888,823, now U.S. Pat. No. 4,888,823 for example, with the above speech recognition system, the detected phonetic segment lattice is passed through previously constructed transition networks for respective words so as to derive several candidate words. In the process of deriving the candidate words, the scoring operation is effected in the transition network so as to output one of the candidate words which has the largest score as the result of recognition process.

However, such a simple scoring calculation may cause an erroneous word to be selected from a plurality of words which are similar to one another, resulting in an erroneous word recognition. That is, in a case where a plurality of words which are similar to one another are given as the candidate words, the result of scoring will be largely dependent on the scores given when the respective candidate words are passed through the transition networks.

Various conventional methods have been proposed as a method for determining the score. However, there is no method by which the proper scores can be derived for all of the starting and ending portions of each word and the transient portion of the speech, and therefore the occurrence of erroneous recognition can not be prevented.

SUMMARY OF THE INVENTION

An object of this invention is to provide a highly reliable speech recognition system in which an improved scoring method is used to enhance the word recognition capability.

This and other objects of the present invention are achieved by a speech recognition system in which an input speech signal is acoustically analyzed to derive feature parameters thereof. A plurality of candidate phonetic segments are extracted from the feature parameters of the input speech signal, and then the candidate phonetic segments are passed through transition networks prepared for respective words to effect the word verification operation. The score of each candidate word is determined by deriving a long-term strategic score by using a maximum similarity normalization method or based on the rate of occurrence of a segment, for example, according to the statistical distribution of similarities or distances of the segment and a short-term strategic score by using a short fall scoring method, for example, according to the environment of the segments included in an input segment lattice. By weighting/averaging the long-term strategic score and short-term strategic score, the word verifying operation using the transition networks is effected.

According to the speech recognition system of this invention using the above scoring method, since the score of each candidate word is determined by using a long-term strategic score derived based on, for example, the probability of occurrence of a segment or by using a maximum similarity normalization method according to the statistical distribution of the similarities or distances of the segment and a short-term strategic score derived by using a short fall scoring method according to the environment of the segments included in an input segment lattice, even a word in which the long-term strategic score tends to be small and the frequency of occurrence is low can be correctly recognized because the short-term strategic score thereof becomes generally high. Further, in a case where the score of a candidate word having a segment which frequently occurs in a transient portion of a speech will become high when determined only by the short-term strategic score, the score thereof can be suppressed to a low value by using the long-term strategic score, thereby making it possible to suppress the occurrence of erroneous recognition for each candidate word.

DETAILED DESCRIPTION OF THE PREFERRED EMBODIMENTS

Figure 1:
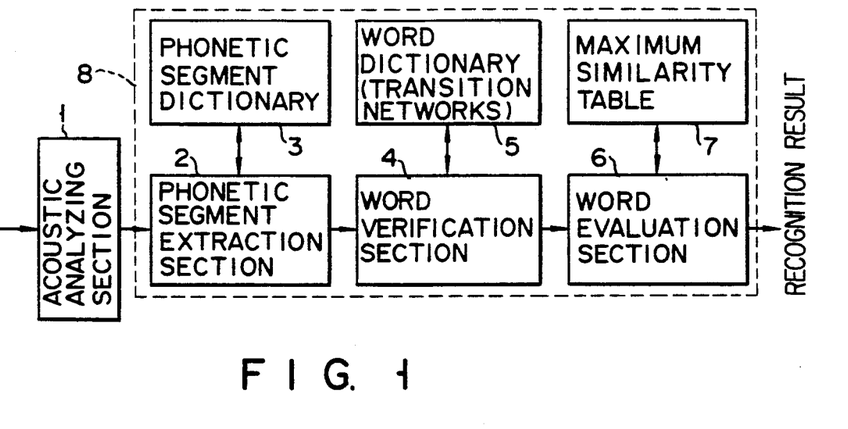
FIG. 1 is a block diagram showing the construction of a speech recognition system according to one embodiment of this invention.

FIG. 1 shows the schematic construction of a speech recognition system realized by using a system according to one embodiment of this invention. The speech recognition system is constructed to verify a plurality of candidate words derived by a word verification section 4 with reference to a maximum similarity table 7 by a word evaluation section 6 and selects a word from the candidate words based on the scores of the candidate words to output as the recognized word.

In FIG. 1, an acoustic analyzing section 1 converts an input speech signal into digital data of 12 bits by using a sampling frequency of 8 KHz, for example, in the same manner as is disclosed in U.S. Pat. No. 4,888,823 and then calculates the acoustic power and linear predictive coding (LPC) analyzing parameter. The acoustic analyzing process in the acoustic analyzing section 1 is effected in a condition that the window length is set at 32 msec, the frame period is set at 10 msec, the order of LPC analysis is set at 12, and the number of terms of each of LPC power spectrum and LPC mel-cepstrum is set at 16.

Figure 2A:
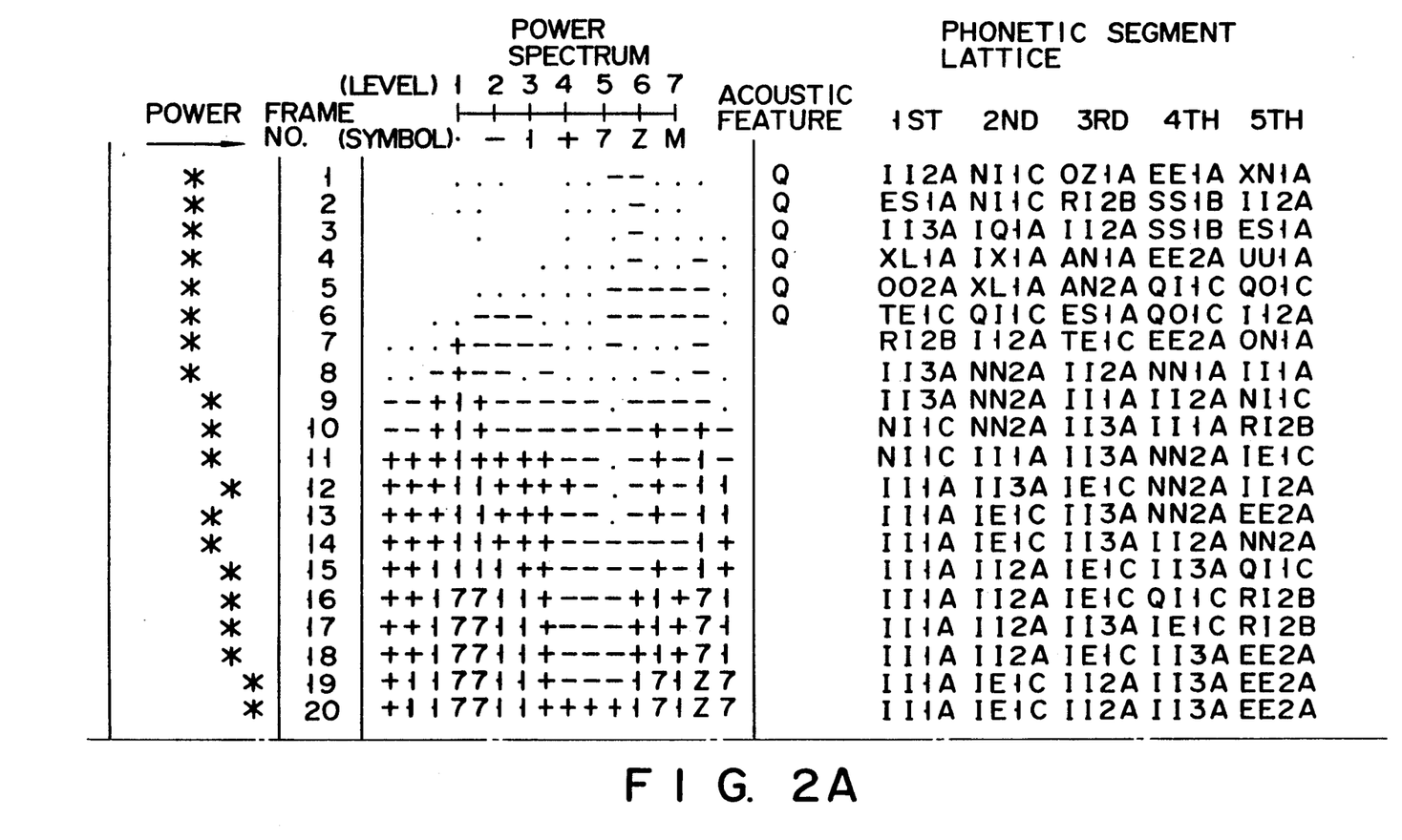
FIGS. 2A and 2B form a diagram showing the feature parameters of an input speech signal of a phonetic segment lattice obtained in the system of FIG. 1 in a frame sequence.
Figure 2B:
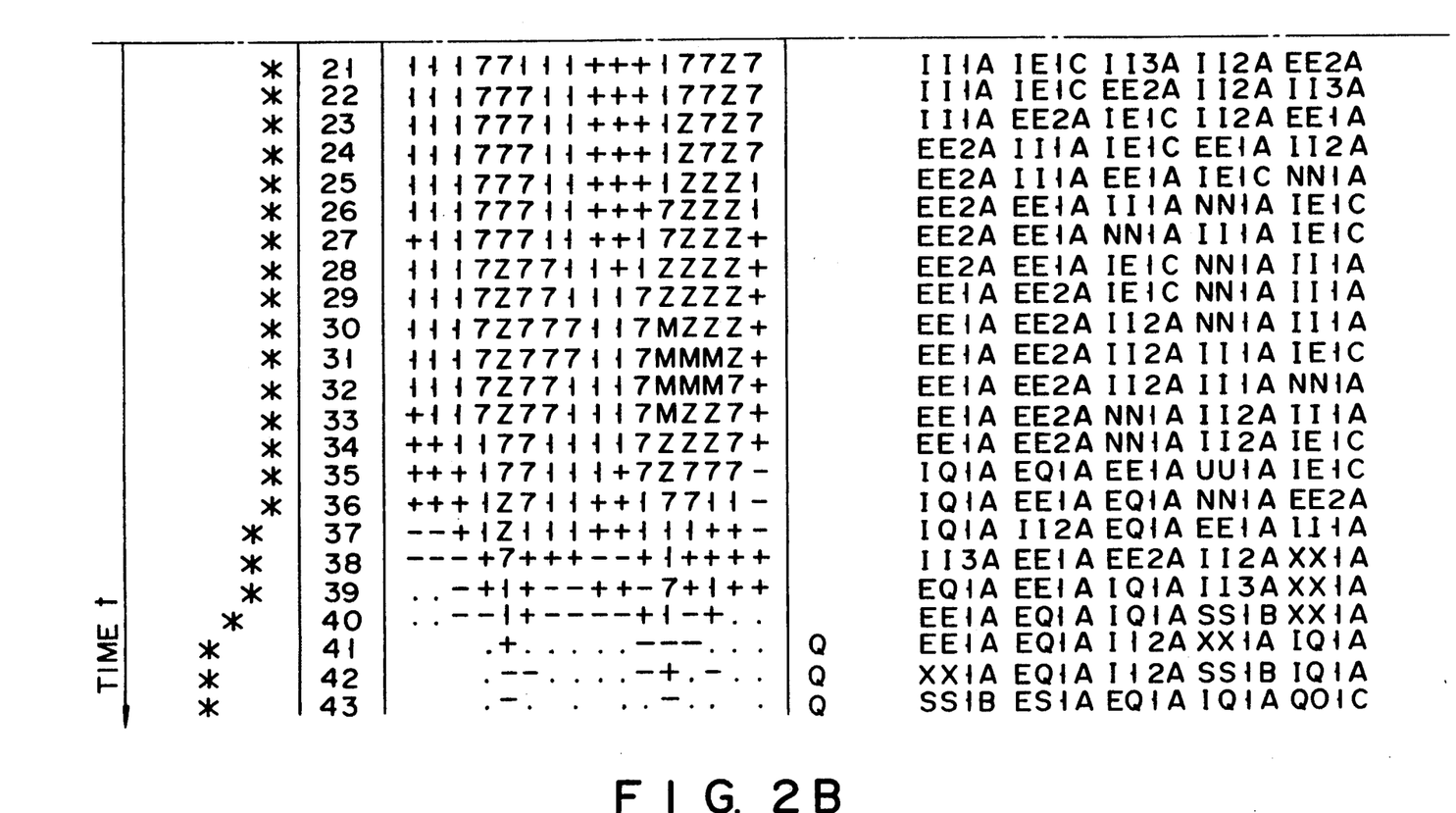

An output of acoustic analyzing section 1 is supplied to a microcomputer 8 in which a phonetic segment extraction section 2 continuously effects a similarity calculation on the time base for deriving the similarity between phonetic segments of a set of orthogonalized dictionaries prepared in a phonetic segment dictionary 3 and feature parameters of the input speech signal derived by the acoustic analyzing section 1 so as to obtain such a phonetic segment lattice as shown in FIG. 2. More specifically, the phonetic segment lattice is derived based on the following multiple LPC mel-cepstrum similarity measure.

$$S_{MC}^{(Ki)} = \frac{\sum_{m=1}^{M} \omega_m^{(Ki)} \left( C \cdot \phi_m^{(Ki)} \right)^2}{||C||^2} \quad (1)$$

where C indicates LPC mel-cepstrum, and $$\omega_m^{(Ki)} \text{ and } \phi_m^{(Ki)}$$

respectively indicate the weight coefficient, obtained from eigen value and eigen vector of a segment name Ki. Further, (·) indicates the inner product and $||\ ||$ indicates the norm.

The thus derived phonetic segment lattice can be represented by segment names LCAT(NI,J) of first to fifth orders as shown in FIG. 2 and by similarities LSIM(NI,J) corresponding to the respective segment names LCAT(NI,J). NI indicates the order of the segments taking the values of 1 to 5.

Further, the phonetic segment extraction section 2 extracts acoustic feature labels of the silence [Q(J)], buzz [B(J)], unvoiced sound [F(J)] and the power dips [D(J)] and transmits the segment information together with the segment lattice (segment name LCAT(NI,J) and the similarity LSIM(NI,J) thereof; NI indicates an order of 1 to 5 to the word verification section 4.

The term "phonetic segment lattice" indicates a phonetic segment lattice which includes the acoustic feature labels if there is no special note.

Figure 3:
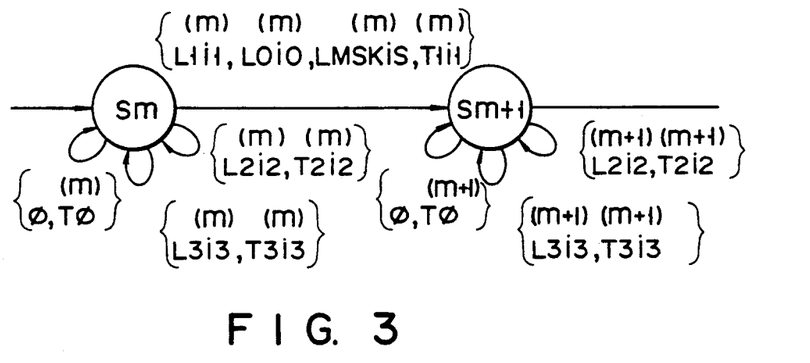
FIG. 3 shows the construction of the basic transition network used in the embodiment of FIG. 1.

The word verification section 4 sequentially effects the word checking operation by reading out the transition network for each word to be recognized from the word dictionary 5 and passing the phonetic segment lattice through the transition networks. The construction of the transition network for each word is explained with reference to FIG. 3. The condition of transition, C(m) in the state Sm can be given as follows:

$$C(m) = \{L1i(m), T1i(m), L0i(m),$$
$$LMSKi(m), L2i(m), T2i(m),$$
$$L3i(m), T3i(m), T\phi(m), NIX(m)\}$$

The condition C(m) indicates that segments in the range of NI = 1 and NIX of the input phonetic segment lattice Q(J1), B(J1), F(J1), D(J1) and LCAT(NI,J1) are searched at a frame or time J1 as described below.

(1) When T1i(m) is a member of the condition and frames are continuously provided in which the segment L1i(m) lies on a higher order than that of the segment L0i(m) and the segment LMSKi(m) is not present, the transition from the state Sm to the state Sm + 1 is permitted. In general, the segment L1i(m) specified in the immediately preceding state Sm-1 is used as the segment L0i(m). In some cases, the segments L0i(m), LMSKi(m) and L3i(m) may be made vacant.

(2) When the above condition is not satisfied it is checked whether or not the search operation can be held in the state Sm while other paths starting from the state Sm are traced in a clockwise direction. At this time, the transition to the state Sm via the paths can be effected at least T2i(m) times for the segment L2i(m) [which may be the same segment as the segment L0i(m)] and T3i(m) times for the segment L3i(m). Further, the transition $\phi$ means that the transition to the same starting state can be effected unconditionally, but the number of permissible times (T$\phi$(m)) by which the transition to the same starting state can be effected is limited for each state.

After the completion of state transition, the searching operation for the transition network is continuously effected in the next frame J1+1. If the transition to the same starting state Sm is inhibited, the searching operation is interrupted and the next candidate word is checked.

During the searching operation for the transition network, the score and time for each state are stored. That is, in a case where the transition is effected through a path including the segments L1i(m) and L2i(m), scores SCR1(Sm) and SCR2(Sm) [corresponding to the preceding score SCR1(Sm-1)] which are equal to the respective similarities are calculated and the maximum one of them is stored. In this case, if the score SCR2(Sm) is larger than the score SCR1(Sm), the latter is stored instead of the former. Then, the score thus stored is supplied to the next stage word evaluation section 6 together with the first-order score (similarity) SCR0(Sm) of the frame which gives the maximum value.

The word evaluation section 6 derives the score Q(k) of a word k according to the following scoring equation (2) by using the afore-mentioned score SCR1 of the phonetic segment, the score SCR01 of the first-order segment and the score SCRmax1 stored in the maximum similarity table 7.

$$Q(k) = \mu \sum_{l=1}^{L} (Sl - S1l) - (1 - \mu) \sum_{l=1}^{L} (Sl - Smaxl) \quad (2)$$

That is, in the scoring equation (2) described above, Sl indicates the similarity of the phonetic segment relating to the scoring calculation and L indicates the number of the phonetic segments. Further, S1l indicates the similarity of a first-order phonetic segment in a frame in which the similarity Sl is obtained or a frame in which the phonetic segment takes the maximum value. A short-term strategic score can be derived based on the first term of the scoring equation (2) by accumulating short fall scores obtained in a short-term strategic manner, and a long-term strategic score can be derived based on the second term of the equation (2) by accumulating the scores normalized by the maximum similarity in a long-term strategic manner. Then, the scores for the candidate words are calculated by weighting the short-term strategic score and long-term strategic score by a preset weighting coefficient $\mu$ ($0 \leq \mu \leq 1$) and taking the average of the short-term strategic scores and long-term strategic scores.

More specifically, the score of the phonetic segment for each candidate word and the score of the first-order segment are set to SCRl and SCR0l [l=1, 2, ---, L], and the score Q(k) of the candidate word k is calculated using equation (3) as set forth below by using the scores SCRi and SCR0l and the maximum similarity score SCRmaxl prepared for each segment in the maximum similarity table 7 with the weighting coefficient $\mu$ set at 0.85.

$$Q(k) = 0.85 \sum_{l=1}^{L} (SCRl - SCR0l) + 0.15 \sum_{l=1}^{L} (SCRl - SCRmaxl) \quad (3)$$

The scores Q(k) thus calculated for respective candidate words are compared with one another and one of the words having the maximum score is selected as the result of recognition.

Figure 5:
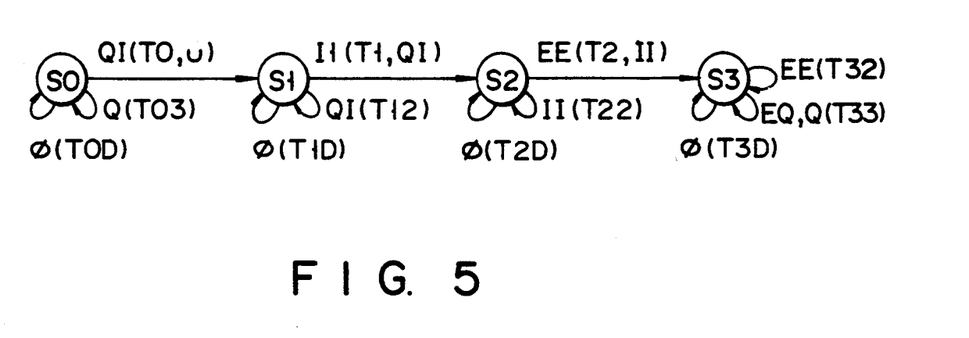
FIG. 5 shows a transition network for the word "iiye (no)" to be recognized.
Figure 6:
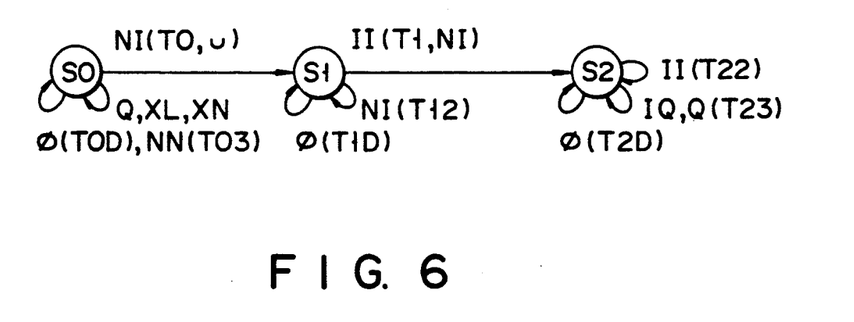
FIG. 6 shows a transition network for the numeral "2 (ni)" to be recognized.

Generally, it is checked whether or not the candidate for the segment lattice of the input speech derived in a manner as shown in FIG. 2 can pass through such transition networks as shown in FIGS. 5 and 6.

The segment lattice of the input speech shown in FIG. 2 indicates the power labels, spectral pattern labels and phonetic segment lattice within the best fifth candidates obtained when a Japanese word "iiye" (no in English) is uttered. The phonetic segments used in this case are constituted by the following segments for 16 words including numerals of 0 to 9, and Japanese words "hai" (yes), "iiye" (no), "moh-ichido" (once more), "dohzo" (please), "teisei" (correction) and "owari" (end).

[1] Acoustic Feature Segment
Silence (Q), Buzz (preceding vocal cord sound) and Unvoiced Sound (F):

[2] Static Segments
Steady Vowel, Fricative Consonant and the like:
AA1A, AA2A, II1A, II2A, II3A, IX1A, UU1A, UU2A, UX1A, EE1A, EE2A, OO1A, OO2A, NN1A, NN2A, SS1A, HH1A, XL1A, XN1A, BZ1A, XX1A.

[3] Consonantal Segment
Segment including the consonant and the transient portion from the consonant to the vowel:
QI1C, QO1C, KU1C, SA1D, SE1D, CI1D, TE1C, NA1B, NI1C, HA1C, MO1B, RI2B, RO1B, RO2B, GO1D, ZE1D, ZO2C, DO1C, DO2C, QY1D, KY1D.

[4] More Boundary Segment
Boundary between different vowels:
AI1C, AN1A, IE1C, EI1C, OI1C, ON1A, OU1C, YU1D, YO1D.
Boundary between a vowel and a consonant:
AN2A, AR1A, ID1A, ER1A, ES1A, OZ1A.
Boundary between a vowel and a silance:
AQ1A, IQ1A, UQ1A, EQ1A, OQ1A, NQ1A.
[5] Other Segments:

Segments having omission of vowels or corresponding modifications other than the segments shown in [1] to [4]:
KQ1C, AQIB, QIXC.

The alphabet attached to the last portion of each segment name indicates the dimensional number of the parameter (LPC, mel-cepstrum coefficient) of the speech pattern constituting a corresponding segment and the number of frames, and is determined as follows:

A=(16, 4), B=(12, 6), C=(10, 8) and D=(8, 10).

The word verification is effected by passing the phonetic segment lattice specified by the above phonetic segments through the transition networks constructed for respective words and stored in the word dictionary 5. That is, the transition network for each word is provided with standard paths which can be easily described based on the phoneme lattice of the word, branches corresponding to the silent portions and other branches corresponding to deformations which have occurred in learning data so that the word can be correctly recognized even when the speech pattern is significantly deformed. Further, in order to effect the searching operation for the transition network in a best first manner, the searching order of the branch representing a larger degree of deformation is set to the lower order.

FIG. 5 shows the transition network for the Japanese word "iiye" to be recognized. In a case where the phonetic segment lattice shown in FIG. 2 is passed through the FIG. 5 transition network, a path from the state S0 to the state S1 in the transition network can be formed "QI" (corresponding to the fifth and sixth frames in FIG. 2) indicating the phonetic segment which corresponds to a transient portion from the silent portion to the vowel portion "i" first appears. Then, "II" indicating the continuous vowel portion "i" is continuously generated over a period of more than a preset number of frames (corresponding to the seventh to 23rd frames in FIG. 2) so that the state S1 may be transferred to the state S2 through a path starting from the state S1. After this, "EE" indicating the vowel portion "e" is continuously generated over a period of more than a preset number of frames (corresponding to the 24th to 40th frames in FIG. 2) so that the state S2 may be transferred to the state S3 through a path starting from the state S2. Then, the end (corresponding to the 41st frame in FIG. 2) of the word is reached and the searching operation for the Japanese word "iiye" is completed. In this way, the input speech can be recognized as the word "iiye" by passing the phonetic segment lattice through the transition network of FIG. 5 for the word "iiye".

However, in the case of the phonetic segment lattice shown in FIG. 2, the phonetic segment lattice is passed not only through the transition network of FIG. 5 corresponding to the word "iiye" but also through the transition network corresponding to the numeral "2 (ni)" as shown in FIG. 6. More specifically, the first portion "NI" (corresponding to the ninth to eleventh frames in FIG. 2) of the numeral "2 (ni)" of ears and the state of the transition network is transferred from the state S0 to the state S1. Then, segments "II" corresponding to the continuous vowel "i" are continuously generated over a period of more than a preset number of frames (corresponding to the 12th to 39th frames in FIG. 7) so that the network state may be transferred from the state S1 to the state S2 through a path starting from the state S1. After this, the network state is transferred from the vowel "i" to the end of the word through the segment "IQ" corresponding to the transient portion between the vowel portion "i" and the silent portion. As a result, the word verification result indicating that the input speech is "2 (ni)" can also be obtained. Therefore, a plurality of word candidates may be obtained as the result of searching operation for the transition networks for respective words, and it becomes impossible to correctly verify and recognize the input speech.

For example, the following methods, described below, are conventionally known as methods for deriving the score of a word based on the score (similarity or distance) of each phonetic segment.

(1) A method for deriving likelihoods of respective phonetic segments based on the statistical distribution of the scores of the phonetic segments and determining the accumulated value of the likelihoods as a word score.

(2) A method for deriving a word score based on the phonetic segment lattice including a plurality of input candidates i consideration of the environment of each phonetic segment.

As the method (1) for deriving the score based on the statistical distribution, the Bayse decision method for deriving the probability of occurrence of the phonetic segment and a scoring method of using the maximum similarity which is disclosed in the article "Connected Word Recognition by Selective Scoring of Phonetic Segment and Word Transition Network" of the Institute of Electronics Information Communication (Denshi Joho Tsushin Gakkai), 1988/9 Vol. J71-D, No. 9 are known. As the method (2) for deriving the word score according to the segment environment, a short fall scoring method for normalizing the score of each segment by using the value of the segment having the largest score among the input segments as is disclosed in "Optimal Search Strategies for Speech Understanding Control" in "Artificial Intelligence" Vol. 18, No. 3 (1982, May) is known.

The scoring method (1) may be regarded as being a long-term strategic scoring method since the statistical similarity distribution formed by a large amount of data is utilized. The scoring method (2) may be regarded as being an optimal scoring method from the short-term standpoint since it is based on the environment such as a difference between the first and second scores in which each phonetic segment is placed. For example, when the first and second scores are 0.95 and 0.90, respectively, the difference 0.95−0.90=0.05 shows the environment.

However, when the above scoring methods are actually used for speech recognition, the following problems occur. That is, the score of each segment tends to become small at portions corresponding to the starting and ending portions of a word which does not frequently occur in the input speech period when only the scoring method (1) is used, and therefore the score for the correct word becomes small, causing an erroneous speech recognition. On the other hand, when only the scoring method (2) is used, the above problem may be solved, but the evaluated score of the segment which frequently occurs at the portion corresponding to the transient portion of the speech tends to be large, causing an erroneous speech recognition.

As described before, the input speech "iiye" shown in FIG. 2 may be passed through the transition network for the word "iiye" and the transition network for the word "2 (ni)". At this time, if the short fall scoring method is used, the average of the maximum values of differences between the similarities of the phonetic segments [QI], [II] and [EE] of the word "iiye" and the similarity of the first-order segment in the same frame is derived as a score of the word "iiye". Likewise, the average of the maximum values of differences between the similarities of the phonetic segments [NI] and [II] of the word "ni" and the similarity of the first-order segment in the same frame is derived as a score of the word "ni". Then, the word recognition for the input speech is effected by comparing the scores respectively corresponding to the averages of the maximum difference values with each other. For example, in this case, the score [0.0] of the word "ni" is larger than the score [−0.1] of the word "iiye" and the input speech "iiye" may be erroneously recognized as the word "ni".

However, if the maximum similarity normalization method which is one of the long-term strategic scoring methods is used to recognize the input speech "iiye", the average of values obtained by normalizing the maximum values of the respective similarities of the phonetic segments [QI], [II] and [EE] by the previously determined maximum similarity is derived as a score and compared with a score obtained as the average of values derived by normalizing the maximum values of the respective similarities of the phonetic segments [NI] and [II] by the previously determined maximum similarity. Therefore, the input speech "iiye" can be correctly recognized as the word "iiye".

In contrast, when a word "2 (ni)" is uttered, the input speech may be passed not only through the transition network for the word "2 (ni)" but also through the transition network for the word "iiye". In this case, a correct speech recognition can be attained by using the short fall scoring method. However, when the maximum similarity normalization method is used in this case, the score [−2.8] of the word "iiye" becomes larger than the score [−6.8] of the word "ni", and as a result, the input speech may be erroneously recognized as the word "iiye".

In this invention, the score Q(k) of a word (k) is derived as follows by using both the long-term strategic score and short-term strategic score in the following manner of equation (4):

$$Q(k) = \mu \sum_{l=1}^{L} (Sl - S1l) + (1 - \mu) \sum_{l=1}^{L} (Sl - Smaxl) \quad (4)$$

Then, an average of the thus derived scores is obtained after they are weighted by a preset weighting coefficient $\mu$ ($0 \leq \mu \leq 1$). Therefore, a score in which the defects of the long-term strategic score and short-term strategic score are eliminated can be obtained. As a result, the frequency of occurrence of erroneous recognition for similar words can be suppressed, thereby enhancing the recognition efficiency.

According to the speech recognition system of this invention in which the word recognition is effected based on the above scoring method, the scores of the candidate words are derived by using the long-term strategic score derived in consideration of the statistical distribution of the similarity or the like of the segments and the short-term strategic score derived in consideration of the segment environment in the input segment lattice. Therefore, the score suitable for permitting the input speech to be efficiently recognized can be attained and the frequency of occurrence of erroneous recognition can be effectively suppressed. Speech samples of 16 Japanese words including numerals and uttered by 75 men were recorded via telephones, the samples of 50 men among them were used for forming the recognition dictionary, and the samples of the remaining 25 men were used for evaluation. In order to effect the above experiment, a device constructed as shown in FIG. 1 was used, 66 types of phonetic segments as described before were manually selected and extracted from the learning samples, and an orthogonalized dictionary was formed by the primal component analysis of the extracted phonetic segments. After this, the learning samples were continuously subjected to a matching process in a time base direction with reference to the orthogonalized dictionary and segment lattices obtained as the result of matching operation were used to constitute transition networks for respective words. Then, the word recognition operation was effected by use of the thus obtained transition networks according to the afore-mentioned scoring method while the weighting coefficient $\mu$ was being changed, and the recognition result shown in FIG. 4 could be obtained.

Figure 4:
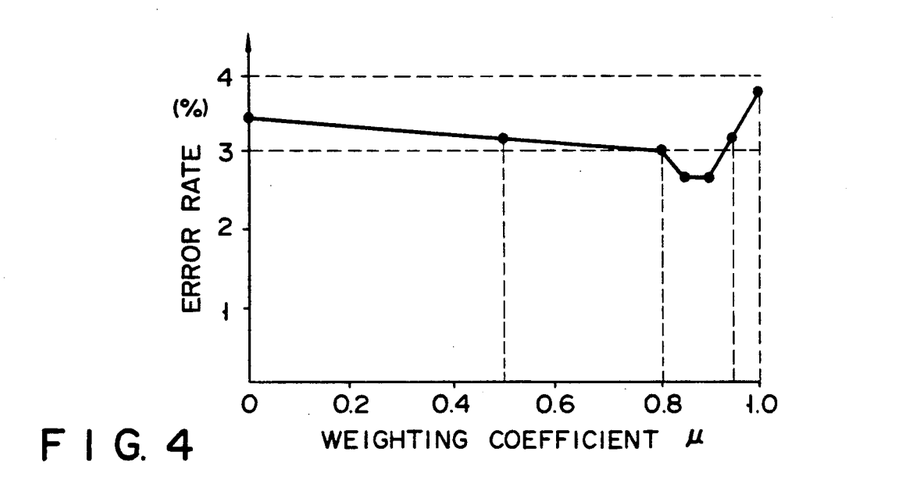
FIG. 4 shows the relation between the weighting coefficient $\mu$ and the recognition error rate.

In FIG. 4, the ordinate indicates the recognition error rate and the abscissa indicates the weighting coefficient $\mu$ for the linear combination. The condition $\mu = 0$ indicates a case in which only the maximum similarity normalizing method which is a long-term strategic scoring method is used and the condition $\mu = 1$ indicates a case in which only the short fall scoring method which is a short-term strategic scoring method is used.

A is clearly understood from the above experimental result, according to the scoring method of this invention the long-term strategic scoring method and short-term strategic scoring method are used in combination so as to suppress the occurrence of erroneous recognition and enhance the recognition efficiency. In particular, it is easily understood from the experimental result that the recognition efficiency can be markedly enhanced when the weighting coefficient $\mu$ is set in the range of [0.5 to 0.95], preferably in the range of [0.85 to 0.95].

Now, an operation of the microcomputer 8 constituting the section including elements 2–7 in the embodiment of FIG. 1 will be described by referring to the flow chart of FIG. 7.

Figure 7:
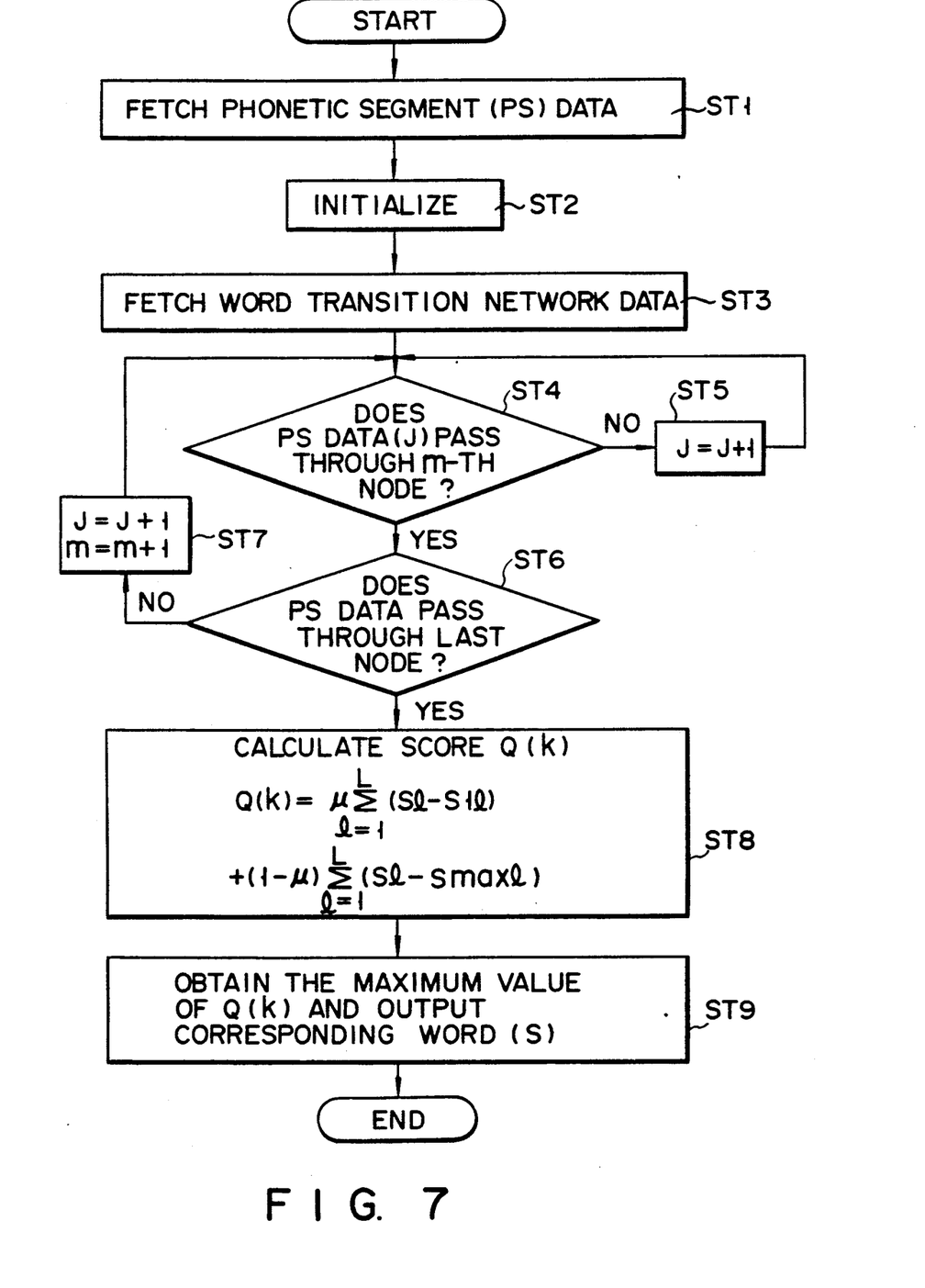
FIG. 7 is a flow chart showing an operation of a microcomputer used in the embodiment of FIG. 1.

First, in step ST1 in FIG. 7, data of phonetic segment (PS) lattice is extracted from analyzing section 1. Then, the flow advances to the next step ST2 where contents of all the registers in the microcomputer are initialized. Then, in the step ST3, a first transition network of FIG. 3 is read out from the word dictionary 5.

In the next step ST4, whether the data PS (J) in the extracted phonetic segment lattice of FIG. 2 passes through the m-th node of the read transition network is checked. If the result of the check is NO, check is performed with the next data PS (J+1).

When the data PS (J) passes through the m-th node, the process advances to the next step ST6 in which whether the data PS (J has passed through the last node of the current transition network is determined.

If NO is obtained in step ST6, the process advances to the step ST7 in which the contents of the registers are incremented as J=J+1, m=m+1, respectively. Then, the process advances to the steps ST4 and ST6 in which whether the succeeding data PS (J+1) passes through the respective nodes or states is checked.

The phonetic segment lattice data representing a word passed through the last node of the transition network includes a score and time obtained while the phonetic segment lattice data passed through the transition network. The phonetic segment lattice data is applied in the equation (2) for calculating the score (k) in the next step ST8. Scores Q(k) calculated for the respective candidate words are compared with each other in the next step ST9 to find out a candidate word which has the maximum score as a recognition result.

As described above, according to this invention, since the scoring operation for the candidate words is effected by considering both the long-term strategic scoring method and short-term strategic scoring method, a significant advantage that the occurrence of erroneous recognition for similar words can be effectively suppressed can be obtained.

This invention is not limited to the above embodiment. For example, the phonetic segment may be defined by determining an acoustically significant segment as a recognition processing unit, and not only a separately uttered word speech but also continuously uttered word sequences may be processed as a speech to be recognized. Further, application of a combination of the long-term strategic scoring method and short-term strategic scoring method is not limited to the above example of weighting/averaging method. This invention can be variously modified without departing from the technical scope thereof.

As described above, according to this invention, adequate scores can be given to the candidate words to suppress the occurrence of erroneous recognition in the speech recognition operation and the recognition efficiency can be enhanced.

What is claimed is:

1. A speech recognition system comprising:
    means for acoustically analyzing an input speech signal for obtaining feature parameters of the input speech signal;
    means for extracting a plurality of candidate phonetic segments from the feature parameters of the input speech signal, the candidate phonetic segments including acoustic feature labels of a silence, buzz, unvoiced sound and power dips;
    means for causing the candidate phonetic segments to be passed through transition networks constructed for respective words to be recognized to effect a word verification operation to obtain candidate words;
    means for determining a work score Q(k) of the candidate word by using a following equation including a first score represented by a first term and a second score represented by a second term of the following equation:

$$Q(k) = \mu \sum_{l=1}^{L} (Sl - Sll) - (1 - \mu) \sum_{l=1}^{L} (Sl - Smaxl)$$

where $\mu$ denotes a weighing coefficient ($0 \leq \mu \leq 1$), Sl denotes a similarity of a phonetic segment in a frame, L denotes a number of phonetic segments, Sll is a similarity of a first-order phonetic segment in a frame in which the phonetic segment takes a maximum value, and Smaxl denotes a maximum similarity of a corresponding phonetic segment;
    mean for selecting that candidate word having the largest candidate score Q(k) to be a result of speech recognition; and
    outputting the selected candidate word as said result of speech recognition.

2. A speech recognition system according to claim 1, wherein the first score represented by the first term of said equation is derived in consideration of a segment environment in an input segment lattice and the second score represented by the second term of said equation is derived in consideration of a statistical distribution of a similarity of the candidate phonetic segments.

3. A speech recognition system according to claim 1, wherein said candidate phonetic segment extracting means includes:
means for continuously performing a similarity calculation between feature parameters extracted from the input speech signal and a set of orthogonalized dictionaries prepared in units of segments in a phonetic segment dictionary during a frame time; and
means for obtaining the candidate phonetic segments of predetermined orders from results of the similarity calculation and a phonetic segment lattice defined by names of the candidate phonetic segments and calculated similarities corresponding to the names of the candidate phonetic segments.

4. A speech recognition system according to claim 3, wherein said phonetic segment lattice is obtained by using a multiple linear predictive coding (LPC) mel-cepstrum similarity measure defined as follows:

$$S_{MC}^{(Ki)} = \frac{\sum_{m=1}^{M} \omega_m^{(Ki)} \left( C \cdot \phi_m^{(Ki)} \right)^2}{||C||^2}$$

where C denotes LPC mel-cepstrum, $$\omega_m^{(Ki)}, \phi_m^{(Ki)}$$

are weight coefficient obtained from eigen value, and eigen vector of a segment name Ki, respectively, ($\cdot$) is an inner product and $||\ ||$ is a norm.

5. A speech recognition system according to claim 4, wherein said phonetic segment extracting means includes further means for extracting at least one of acoustic feature labels including power labels, spectral pattern labels, silence [Q(J)], buzz [B(J)] unvoiced sound [F(J)] and power dips [D(J)] selected from first term in said LPC mel-cepstrum.

* * * * *